(12) United States Patent
Holtheide et al.

(10) Patent No.: US 10,632,808 B2
(45) Date of Patent: Apr. 28, 2020

(54) LONGITUDINAL CONTROL ARM DEVICE OF A DRIVABLE SEMI-INDEPENDENT SUSPENSION

(71) Applicant: ZF Friedrichshafen AG, Friedrichshafen (DE)

(72) Inventors: Josef Holtheide, Neuenkirchen (DE); Alfons Nordloh, Visbek (DE); Markus Wulf, Hille (DE); Michael Beyer, Porta Westfalica (DE); Felix Kallass, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 209 days.

(21) Appl. No.: 15/744,096

(22) PCT Filed: Jun. 13, 2016

(86) PCT No.: PCT/EP2016/063425
§ 371 (c)(1),
(2) Date: Jan. 12, 2018

(87) PCT Pub. No.: WO2017/008966
PCT Pub. Date: Jan. 19, 2017

(65) Prior Publication Data
US 2018/0201081 A1    Jul. 19, 2018

(30) Foreign Application Priority Data

Jul. 16, 2015   (DE) .................. 10 2015 213 355

(51) Int. Cl.
*B60G 7/00*         (2006.01)
*B60K 7/00*         (2006.01)
*B60G 21/05*        (2006.01)

(52) U.S. Cl.
CPC ............. *B60G 7/001* (2013.01); *B60G 7/008* (2013.01); *B60G 21/051* (2013.01);
(Continued)

(58) Field of Classification Search
CPC .......................... B60G 21/051; B60K 7/0007
See application file for complete search history.

(56) References Cited

U.S. PATENT DOCUMENTS 9,038,707 B2 *  5/2015  Mair .................... B60K 7/0007
                                                        164/137
9,045,029 B2 *  6/2015  Mair .................... B60K 7/0007
(Continued)

FOREIGN PATENT DOCUMENTS

DE   10 2011 009 040 A1   8/2011
DE   10 2011 005 616 A1   9/2012
(Continued)

OTHER PUBLICATIONS

German Office Action Corresponding to 10 2015 213 357.5 dated Mar. 15, 2016.
(Continued)

*Primary Examiner* — Nicole T Verley
(74) *Attorney, Agent, or Firm* — Davis & Bujold PLLC; Michael J. Bujold

(57) ABSTRACT

A trailing arm device (1) of a drivable torsion beam axle (2) is described. The trailing arm device (1) has a housing (5) in which a drive-train (8) can be arranged and is connected to a trailing arm (4). The housing (5), as fitted into position within a vehicle, has a sidewall (11) formed integrally with a central housing region (9) on a side facing toward a wheel. The sidewall delimits a housing interior space (10) that accommodates, at least partially, the drive-train (8). On the side facing away from the wheel, the housing interior space
(Continued)

(10) is delimited by at least one cover element (14) that can be detachably connected to the central housing region (9).

18 Claims, 6 Drawing Sheets

(52) U.S. Cl.
 CPC ........ *B60K 7/0007* (2013.01); *B60G 2200/21* (2013.01); *B60G 2202/136* (2013.01); *B60G 2204/129* (2013.01); *B60G 2204/1244* (2013.01); *B60G 2204/148* (2013.01); *B60G 2204/18* (2013.01); *B60G 2204/182* (2013.01); *B60G 2206/10* (2013.01); *B60G 2300/50* (2013.01)

(56) References Cited

U.S. PATENT DOCUMENTS

| | | | |
|---|---|---|---|
| 9,132,723 | B2 | 9/2015 | Munster et al. |
| 9,227,506 | B2 * | 1/2016 | Mair .................... B60K 7/0007 |
| 10,011,164 | B2 * | 7/2018 | Tamura ................ B60K 17/043 |
| 2012/0248850 | A1 * | 10/2012 | Hirano ................ B60K 7/0007 301/6.5 |
| 2012/0292978 | A1 | 11/2012 | Buschjohann et al. |
| 2014/0374178 | A1 * | 12/2014 | Lee ...................... B60K 7/0007 180/65.51 |

FOREIGN PATENT DOCUMENTS

| | | |
|---|---|---|
| DE | 10 2011 005 625 A1 | 9/2012 |
| DE | 10 2011 080 037 A1 | 1/2013 |
| DE | 10 2011 080 236 A1 | 2/2013 |
| DE | 10 2011 082 390 A1 | 3/2013 |
| DE | 10 2011 055 625 A1 | 5/2013 |
| EP | 2 340 953 A1 | 7/2011 |
| EP | 2 815 905 A1 | 12/2014 |
| EP | 2 818 350 A1 | 12/2014 |
| FR | 2965786 A1 * | 4/2012 ............... B60G 3/14 |

OTHER PUBLICATIONS

International Search Report Corresponding to PCT/EP2016/063425 dated Aug. 4, 2016.
International Search Report Corresponding to PCT/EP2016/063424 dated Aug. 4, 2016.
Written Opinion Corresponding to PCT/EP2016/063425 dated Aug. 4, 2016.
Written Opinion Corresponding to PCT/EP2016/063424 dated Aug. 4, 2016.

* cited by examiner

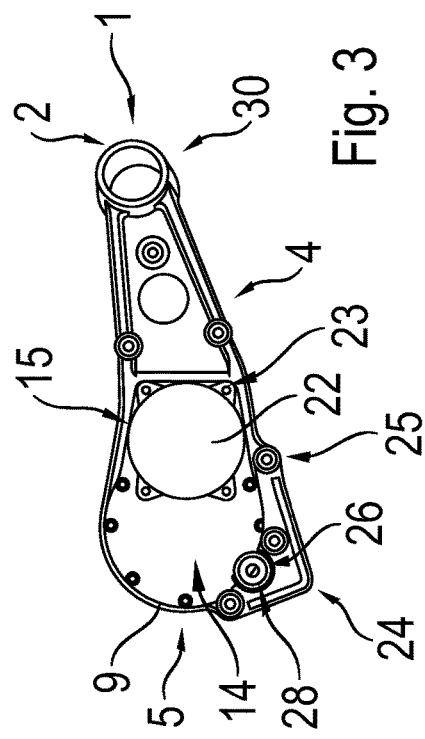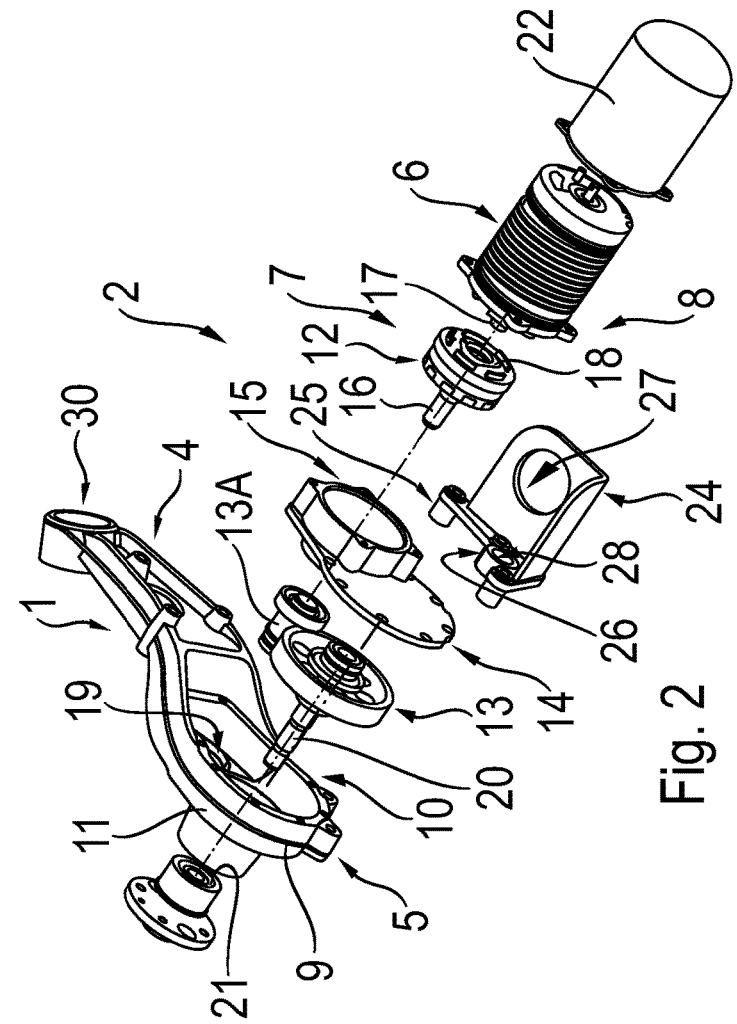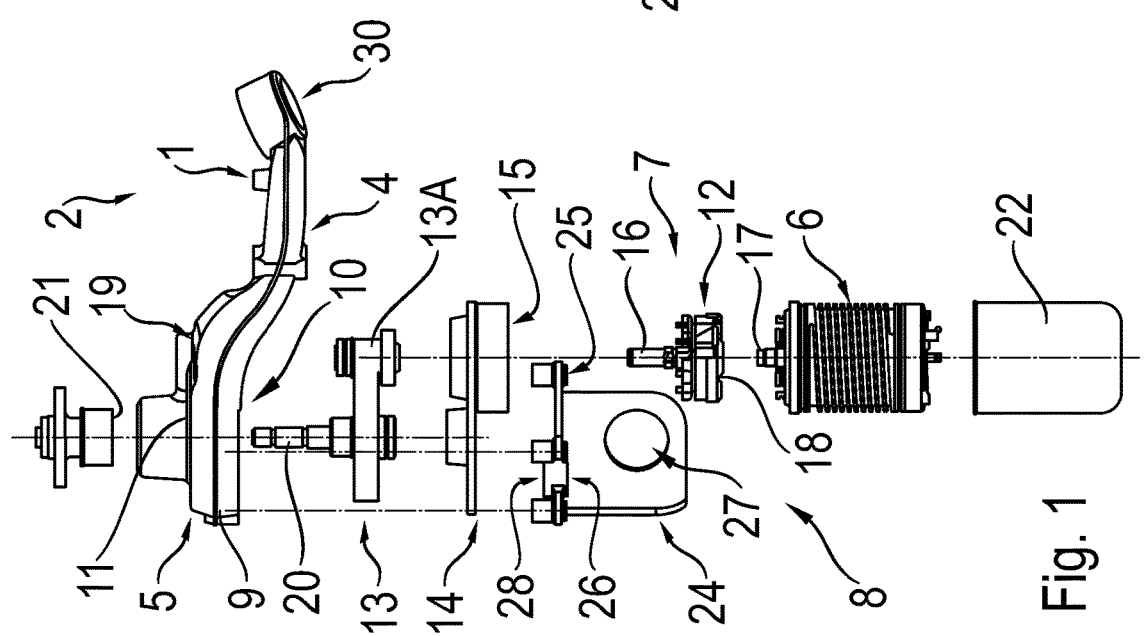

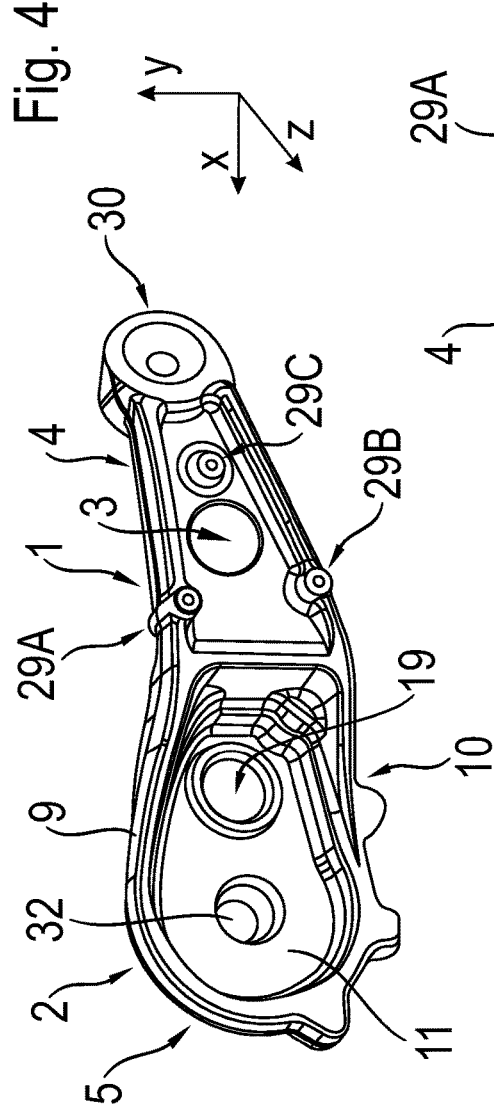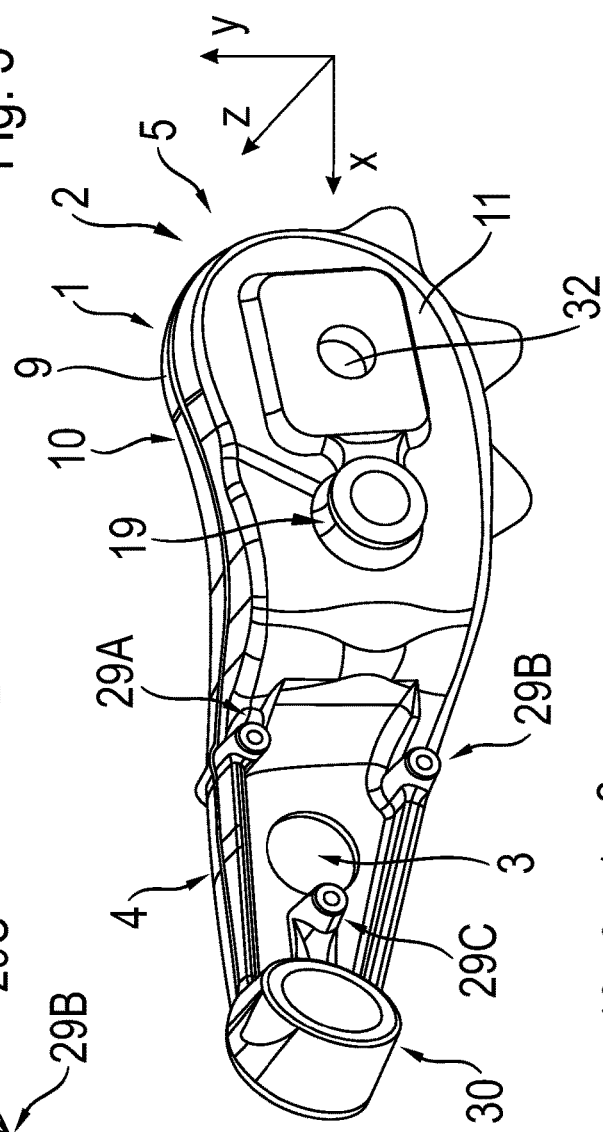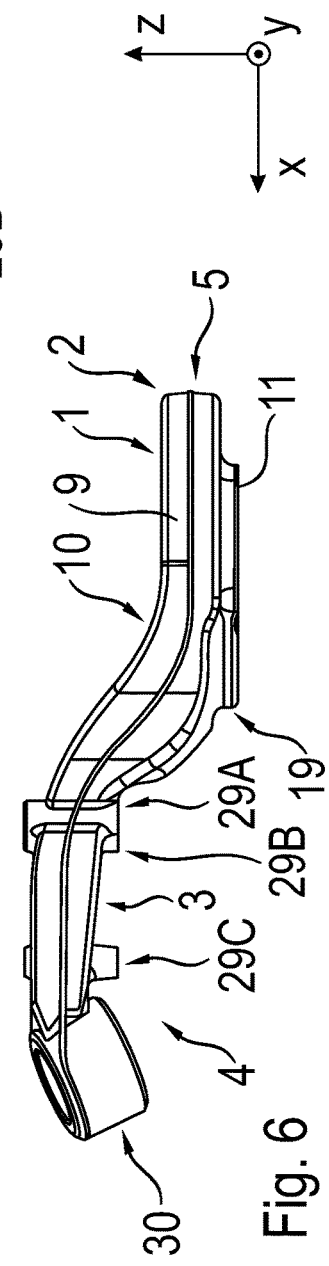

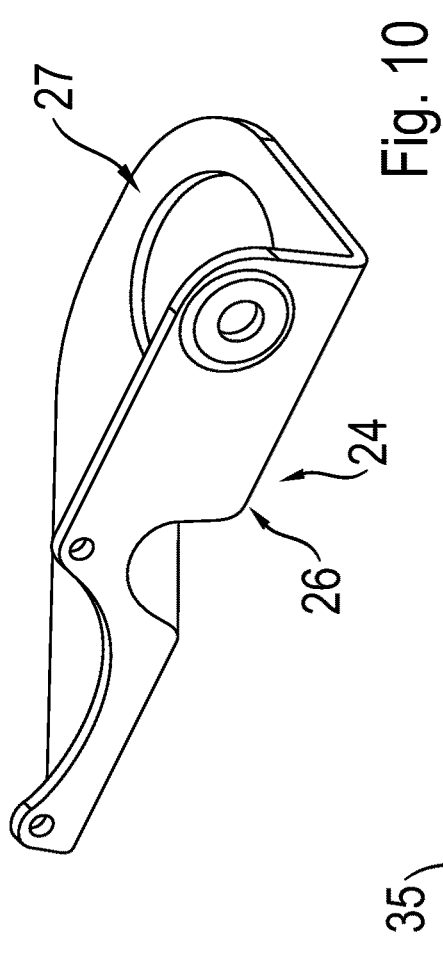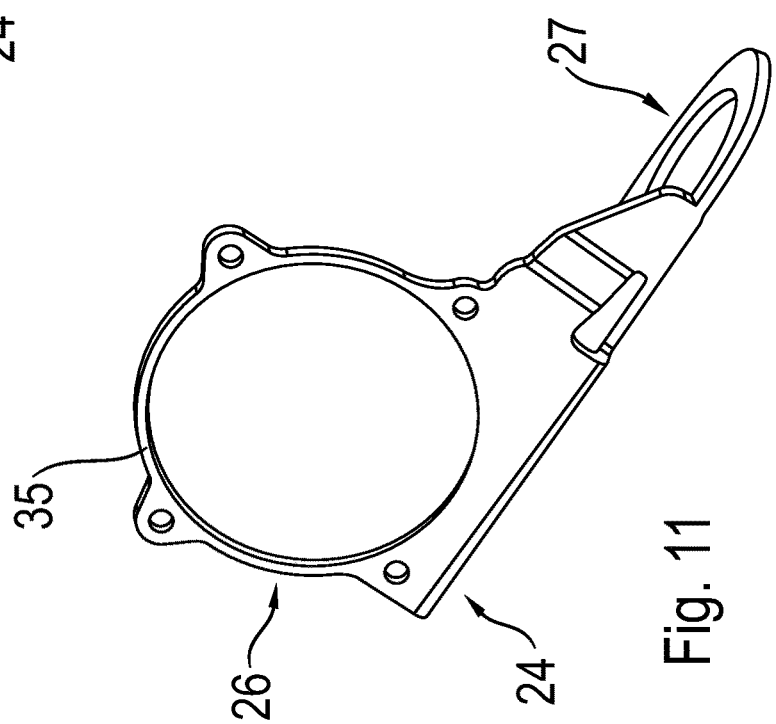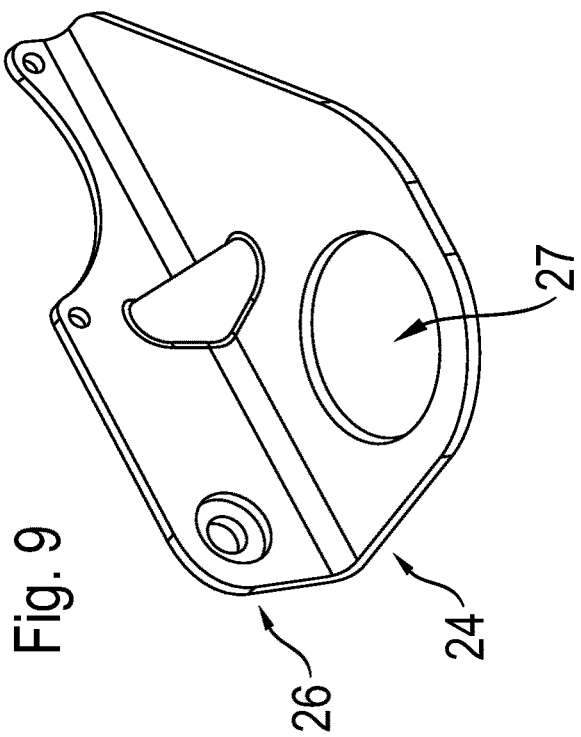

LONGITUDINAL CONTROL ARM DEVICE OF A DRIVABLE SEMI-INDEPENDENT SUSPENSION

This application is a National Stage completion of PCT/EP2016/063425 filed Jun. 13, 2016, which claims priority from German patent application serial no. 10 2015 213 355.9 filed Jul. 16, 2015.

FIELD OF THE INVENTION

The invention concerns a longitudinal control arm device of a drivable torsion beam axle.

BACKGROUND OF THE INVENTION

From practice, a so-termed drivable torsion beam axle or electric twist beam (ETB) is known, in which an electric passenger car drive is integrated in a rear torsion beam axle. In this case an ETB has, respectively on the left and right wheel, a compact unit or drive-train which comprises a transmission and an electric motor. In each case, the drive-train is arranged in a housing which is in turn part of a trailing arm. The two trailing arms, respectively arranged on the outsides of the vehicle, are connected to one another by means of a transverse profiled element extending essentially in a transverse direction of the vehicle and can be connected to the vehicle body in the area of main mountings. Furthermore, when installed in the vehicle the trailing arms are additionally coupled to a vehicle body by spring and damper units. By virtue of the two separate drive-trains, among other things a selective, wheel-individual torque distribution, the so-termed torque vectoring, can be implemented.

Furthermore, DE 10 2011 005 625 A1 describes a drive device for driving a wheel of a torsion beam axle of an electrically powered vehicle, which comprises an electric machine and a transmission connected on the drive output side of the electric machine as viewed in the force flow direction during traction operation. The housing of the electric machine or the housing of the transmission are bolted directly to the trailing arm of the torsion beam axle, or integrated as a multi-component welded structure in the trailing arm, or made integrally as one piece with the trailing arm. Moreover, the electric machine and the transmission can have a common housing.

Housings of the electric machine and/or the transmission made integrally with the trailing arm conflict with the desire to produce the transmission and/or the electric machine of an ETB as a module that can be preassembled, which during final assembly can be connected to the trailing arm simply and inexpensively.

In contrast, housings of the transmission and/or the electric machine connected to the trailing arm by bolt connections, by way of which tire forces have to be passed on toward the vehicle body, are undesired. This results from the fact that during driving operation of a vehicle made with an ETB, bolt connections between a housing of a transmission and/or an electric machine and a trailing arm are exposed to alternating stresses which affect a sealing device in the area of the parting joint between the housing and the trailing arm to an undesired extent. To ensure a durable sealing effect, more sealing effort and expense has to be spent on that area, but this makes the production of an ETB more costly overall.

SUMMARY OF THE INVENTION

Accordingly, the purpose of the present invention is to make available an inexpensive trailing arm device of a drivable torsion beam axle, which is characterized by long service life.

According to the invention, this objective is achieved by a trailing arm device having the characteristics specified in the claims.

The trailing arm device according to the invention, of a drivable torsion beam axle or an ETB, comprises a housing within which a drive-train can be arranged and which is connected to a trailing arm.

According to the invention, when installed in position in a vehicle, the housing has on a side facing toward a wheel a sidewall which is made integrally with a central housing region, the sidewall delimiting a housing interior space that accommodates the drive-train at least in part, while on the side facing away from the wheel, the housing interior space is delimited by at least one cover element that can be connected detachably onto the central housing region.

By virtue of the integral design on the wheel side of the housing of the trailing arm device, which housing accommodates the drive-train at least in part, it is avoided in a simple manner that tire forces occurring during the operation of a vehicle are transmitted from a wheel axle, via bolt joints between a housing component and a trailing arm, toward the vehicle body. Moreover, in this area exposed to alternating loads, compared with the torsion beam systems known from the prior art, the sealing effort and expense required is reduced to a minimum, so that the trailing arm device according to the invention and a drivable torsion beam axle comprising it can be produced inexpensively.

Furthermore, thanks to the inventive design of the trailing arm device on a side facing away from a wheel with the at least one cover element that can be connected detachably to the central housing region, it is possible with little effort to make the drive-train at least partially as a preassembled modular unit and, during the assembly of a drivable torsion beam axle, to insert it with little assembly effort into the interior housing space of the trailing arm device according to the invention, and connect it to the trailing arm device.

In addition, thanks to the integral design, on the wheel side, of the housing of the trailing arm device according to the invention, with little effort the load on the drive-train is reduced, since only a small proportion of the tire forces is introduced into the drive-train components arranged within the housing interior space, whereby additional acoustic running noises caused by drive-dynamic effects is reduced to a desirable extent.

If the central housing region and the trailing arm are integrally made as one piece, again tire forces can be supported in the area of a vehicle body by an integral component that can be made appropriately for the loads expected with little design effort.

If the cover element is made as an intermediate plate with a holding area in which at least part of a transmission device of the drive-train can be arranged, the drive-train can be made completely as a preassembled component and can be integrated into the trailing arm device with little effort during the final assembly of a drivable torsion beam axle.

In an embodiment of the trailing arm device according to the invention also characterized by little assembly effort, on the side of the cover element facing away from the central housing region a further cover element connected detachably to the cover element is provided, in which an electric machine of the drive-train can be at least partially arranged.

This embodiment provides the possibility of making the further cover element as a preassembled partial module and the cover element as a further preassembled partial module, which for example are preassembled and connected to the central housing region before the final assembly of a drivable torsion beam axle.

If the trailing arm has a recess in the area of which the trailing arm can be connected to a transverse profiled element of a torsion beam axle, a drivable torsion beam axle can again be assembled with little effort.

In an advantageous further development of the trailing arm device according to the invention, for its connection to the transverse profiled element, the trailing arm preferably has three threaded zones, two of which, in the installed position of the trailing arm in a vehicle, are arranged in the vertical direction of the vehicle at a distance apart from one another and essentially at least approximately one above the other, while the third threaded zone is provided on the trailing arm at a distance away from the other two threaded zones in the longitudinal direction of the vehicle. Alternatively, the trailing arm can also have four or even five threaded zones.

In that way a transverse profiled element can again be connected to the trailing arm device with little effort and wheel forces introduced into the trailing arm device in the area of one side of the vehicle can be passed on by way of the transverse profiled element toward the trailing arm device arranged on the other side of the vehicle. A vehicle made with the trailing arm device according to the invention then shows or can be operated with a desired driving behavior in a simple manner.

If the trailing arm has a further recess in the area of which a main mounting can be arranged, by means of which in a known manner a drivable torsion beam axle can be connected to a vehicle axle, again a drivable torsion beam axle can be installed with little effort to a vehicle.

If a connecting device is made with a coupling area to the trailing arm and/or to the central housing region and with a connection area, such that in the connection area a spring device and/or a damper device can be connected to the connecting device, then the connecting device can be made as a component on its own which, during the assembly of the trailing arm device, can be connected to the trailing arm and/or to the central housing region and thereafter be functionally connected with a transverse profiled element together with the trailing arm device.

If an output shaft of an electric machine of the drive-train can be connected in the area of the cover element to a shaft of a planetary gearset, and a further shaft of the planetary gearset can be passed through an opening in the cover element and connected to a spur gear stage of the transmission device on the side of the cover element facing away from the electric machine, a drivable torsion beam axle can be made to the desired extent with a two-stage transmission and a maximum rotational speed concept, which enable the use of an electric machine with optimized efficiency for everyday use, which supplies high power while at the same time using less material. With such a drive unit, high torques in the area of the vehicle axles can be produced already during a starting process, and a vehicle constructed with a drivable torsion beam axle comprising a trailing arm device according to the invention, which has a desirable level of drive power, can be made available.

In a simply designed and inexpensive embodiment of the trailing arm device according to the invention, at least one of the spur gears of the spur gear stage can be mounted in a bearing seat of the sidewall.

In another simply designed, space-saving and inexpensive embodiment of the trailing arm device according to the invention, a wheel shaft can be installed so that it projects through the sidewall into the interior space of the housing.

In further advantageous embodiments of the trailing arm device according to the invention, the trailing arm device is, for example, made at least in part in the form of a forged component and/or a cast component, particularly of aluminum. If the trailing arm device is a forged component, higher tire forces can be passed via the trailing arm device toward the vehicle body, whereas trailing arm devices in the form of castings can be made in a simple manner with better component tolerances compared with forged components, and this reduces the cost of producing the trailing arm device.

If the further cover component is at least approximately pot-shaped, an electric machine can, with little effort, be accommodated in the further cover component and this can be mounted as a space-saving, cartridge-shaped and prefabricated module on the central housing region.

It is also possible, besides the electric machine, to arrange a power electronic unit together with a converter in the further cover element.

In other easily installed embodiments of the trailing arm device according to the invention, a spring seat and/or a damper seat is made integrally with the trailing arm and/or with the central housing region and/or with the cover element and/or with the further cover element.

Both the characteristics indicated in the claims and those indicated in the following example embodiments of the trailing arm device according to the invention are in each case suitable, whether as stand-alone features or in any desired combination with one another, as further developments of the object of the invention.

Further advantages and advantageous embodiments of the trailing arm device according to the invention emerge from the claims and the example embodiments whose principle is described below with reference to the drawing. For the sake of clarity, in the description of the various example embodiments the same indexes are used for the same or functionally equivalent components.

BRIEF DESCRIPTION OF THE DRAWINGS

The drawings show:

FIG. 1: An exploded view of a first embodiment of a trailing arm device, seen from above;

FIG. 2: An exploded view of the trailing arm device according to FIG. 1, seen obliquely from above;

FIG. 3: A side view of the trailing arm device according to FIG. 1;

FIG. 4: A side of a trailing arm facing away from the wheel and a central housing region of the trailing arm device according to FIG. 1 made integrally therewith, shown in isolation;

FIG. 5: A view on the wheel side, of the trailing arm and the central housing region of the trailing arm device according to FIG. 1;

FIG. 6: The trailing arm according to FIG. 1 and the central housing region connected thereto, seen from above;

FIG. 9: A first embodiment of a connecting device in the area of which a spring device can be connected to the central housing component;

FIG. 10: Another view of the connecting device according to FIG. 9;

FIG. 11: A detailed view of a second embodiment of the connecting device.

DETAILED DESCRIPTION OF THE PREFERRED EMBODIMENTS

Figure 7:
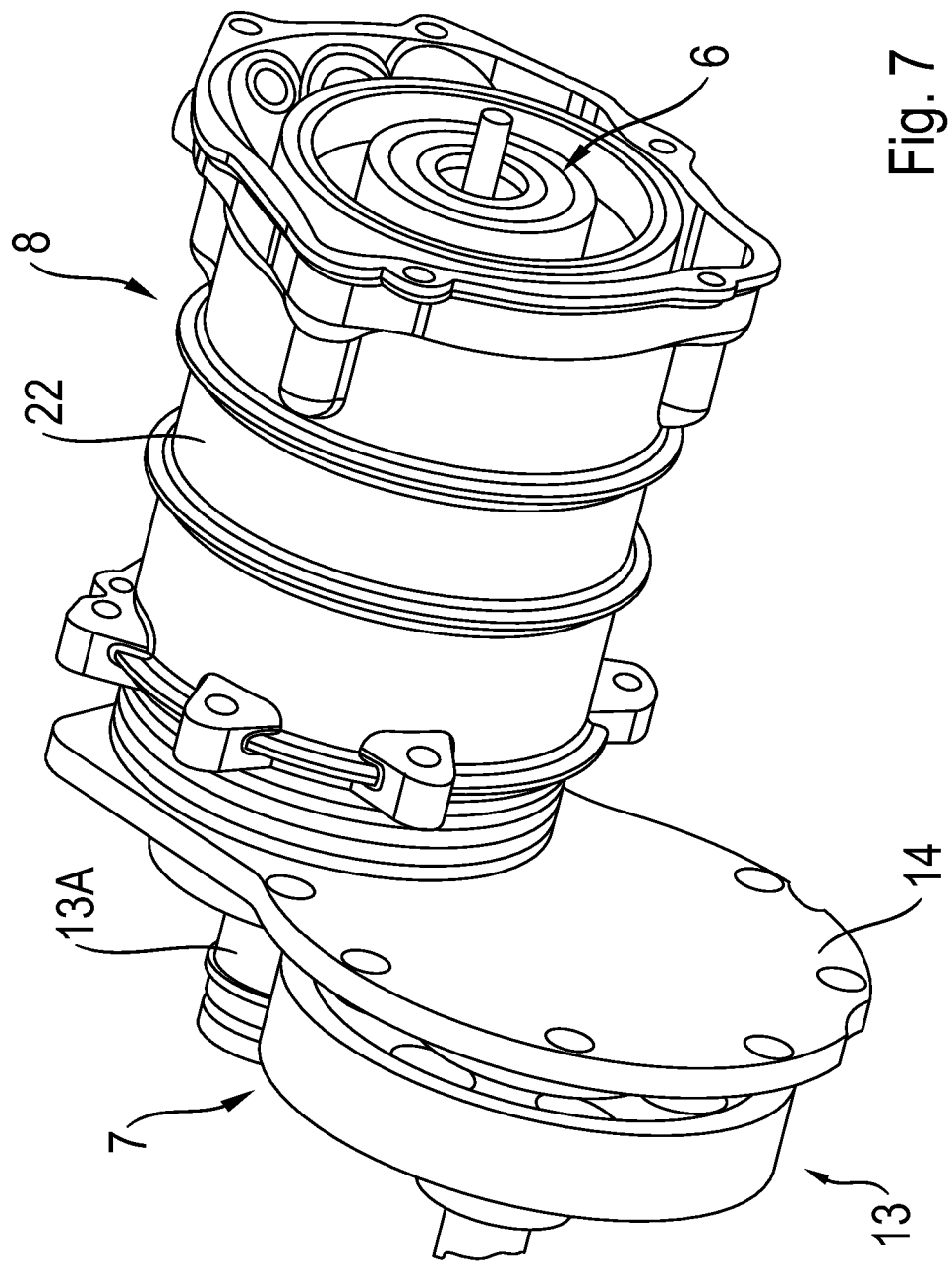
FIG. 7: A three-dimensional detailed view of a drive-train that can be arranged in a housing inside space of the trailing arm device according to FIG. 1.

FIGS. 1 and 2 are exploded representations of a first embodiment of a trailing arm device 1 of a drivable torsion beam axle 2. When installed in a vehicle the drivable torsion beam axle 2 has a trailing arm device 1 on each side of the vehicle, which are installed essentially in the longitudinal direction x of the vehicle and, in the area of seats 3 of a trailing arm 4, are connected preferably by both interlock and friction force to a transverse profiled element that extends in the transverse direction of the vehicle.

For its connection to the transverse profiled element, in this case the trailing arm 4 has three threaded zones 29A to 29C, two of which 29A, 29B, in the installed position of the trailing arm 4 in a vehicle, are arranged at a distance apart from one another in the vertical direction y of the vehicle and essentially approximately one above the other, whereas the third threaded zone 29C is provided on the trailing arm 4 at a distance away in the longitudinal direction x of the vehicle from the other two threaded zones 29A, 29B, and is arranged between the other two threaded zones 29A and 29B in the vertical direction y of the vehicle. In addition the trailing arm 4 has a further seat 30 in the area of which a main mounting preferably in the form of a rubber mounting can be inserted, by means of which, in a manner known as such, the torsion beam axle 2 can be connected in the area of a vehicle body of a vehicle.

Furthermore, FIG. 3 shows a side view of the trailing arm device 1 according to FIGS. 1 and 2, such that FIG. 3 shows a side A of the trailing arm device 1 facing away from a vehicle wheel when the trailing arm device 1 is in a installed position in a vehicle. The trailing arm 4 is made with a housing 5, in which a drive-train 8 comprising an electric machine 6 and a transmission device 7 is integrated.

On a side R facing toward a wheel when installed in a vehicle, the housing 5 has a central housing region 9 formed integrally with a sidewall 11 that delimits a housing inside space 10, which space accommodates the drive-train 8 at least in part. On the side A facing away from the wheel, the housing inside space 10 is delimited by a cover element 14 detachably connected to the central housing region 9.

During assembly of the trailing arm device 1 both the electric machine 6 and the transmission device 7, the latter comprising in this case a planetary gearset 12 and a spur gear stage 13, are inserted into the housing 5 from the side A of the trailing arm 4 or its central housing region 9 facing away from the wheel, since on the wheel side R, the housing 5 is made integrally with the sidewall 11.

The central housing region 9 and the trailing arm 4 are made integrally, as one piece. Moreover, the cover element 14 is in the form of an intermediate plate with a holding area 15. In the present case, the planetary gearset 12 of the transmission 7 of the drive-train 8 is at least partially arranged in the holding area 15. A shaft 16 of the planetary gearset 12, which can be a sun gear, a planetary carrier or a ring gear, passes through the plane formed by the cover element 14 and, on the side R of the cover element 14 facing toward the wheel, is functionally connected to the spur gear stage 13. In its installed operational condition in the housing inside space 10, the spur gear stage 13 is positioned on the side R of the cover element 14 facing toward the wheel. In addition, in the area of the cover element 14, an output shaft 17 of the electric machine 6 of the drive-train 8 can be connected to a shaft 18 of the planetary gearset 12, or is connected thereto in the installed condition, the shaft can again be a sun gear, a planetary carrier or a ring gear. A spur gear 13A of the spur gear stage 13 is mounted to rotate in a bearing seat 19 of the sidewall 11. Furthermore, a wheel shaft 20 projects through the sidewall 11 into the housing interior space 10 and is mounted to rotate by virtue of a wheel bearing 21 in the area of the sidewall 11.

On the side of the cover element 14 facing away from the central housing region 9, a further cover element 22 connected detachably to the cover element 14 is provided, in which the electric machine 6 is arranged. In the present case, the further cover element 22 is cup-shaped or cartridge-shaped and, together with the electric machine 6, forms a preassembled module which can be attached firmly to the cover element 14 by means of screw joints 23 as shown in FIG. 3, and thus functionally connected with the central housing region 9.

A connecting device 24, by means of which a spring device and a damper device can be coupled, is in this case connected by screws 25 to the central housing region 9. For this, the connecting element 24 is connected at a coupling area 26 to the central housing region 9 and is designed with connection areas 27, 28 in the areas of which the spring device and the damping device can be joined to the connecting device 24.

FIGS. 4 to 6 show a trailing arm 4 and the central housing region 9 as viewed from A, from R, and from above, respectively. It can be seen from the representations in FIGS. 4 and 5 that the sidewall 11 is made with a bore 32 through which the wheel shaft 20 can be introduced into the inside space 10 of the housing. In addition FIG. 4 shows the bearing seat 19 which is in the form of a cylindrical recess in the sidewall 11. The threaded zones 29A to 29C extend in the transverse direction z of the vehicle essentially over the full width of the trailing arm 4. In the present case the threaded zones 29A to 29C are in the form of blind holes with internal threads, so that when the transverse profiled element is positioned on the trailing arm 4 any penetration of dirt into the threaded zones 29A to 29C can be prevented with little effort.

FIG. 7 in turn shows the electric machine 6 and the transmission device 7, with the electric machine 6 arranged in the cup-like further cover element 22. The further cover element 22 is firmly connected to the cover element 14, in the holding area 15 of which the planetary gearset 12 is arranged as described earlier, while the spur gear stage 13 is installed on the side of the cover element 14 facing away from the electric machine 6. The cover element 14, the further cover element 22, the electric machine 6 and the transmission device 7 form a preassembled module which can be attached onto the central housing region 9 by screws with little effort during final assembly of the drivable torsion beam axle 2.

Figure 8:
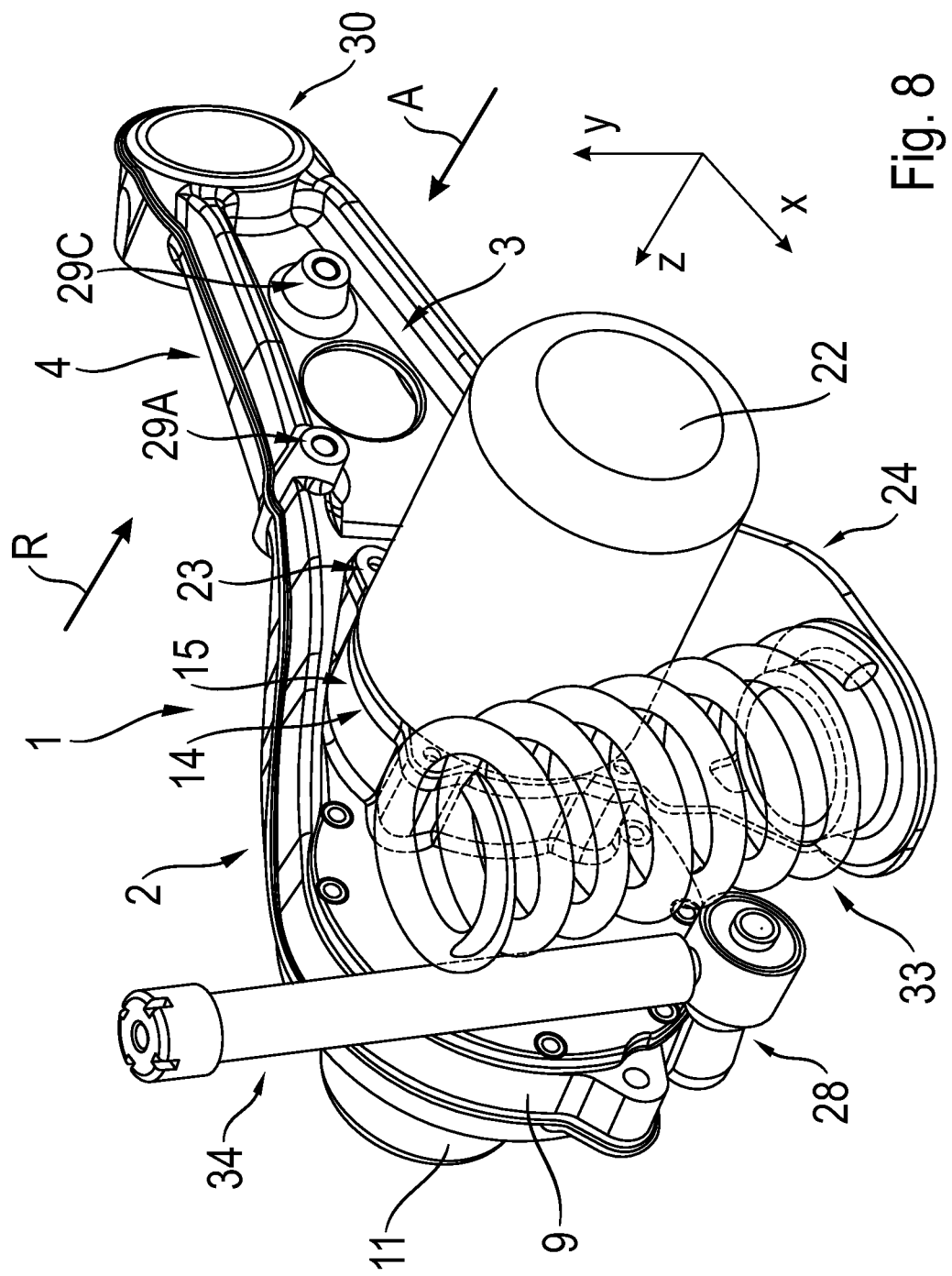
FIG. 8: A three-dimensional representation of the trailing arm device according to FIG. 1, with a spring and damper unit in the fully assembled condition.

FIG. 8 shows a three-dimensional view of the trailing arm device 1 according to FIG. 1 with a spring device 33 attached to the connecting device 24 and a damping device 34 connected to the central housing region 9, these being arranged essentially next to one another in the vertical direction y of the vehicle. In addition, FIGS. 9 and 10 each show a three-dimensional detail representation of the connecting device 24 seen in two different views, while FIG. 11 shows a further embodiment of the connecting device 24. The connecting device according to FIGS. 9 and 10 is connected in the installed operating condition only to the central housing region 9, whereas the further embodiment of the connecting device 24 according to FIG. 11 is made with a circular base area 35 which in the installed operating condition of the connecting device 24 is arranged between the cover element 14 and the further cover element 22 and is connected firmly thereto.

Figure 12:
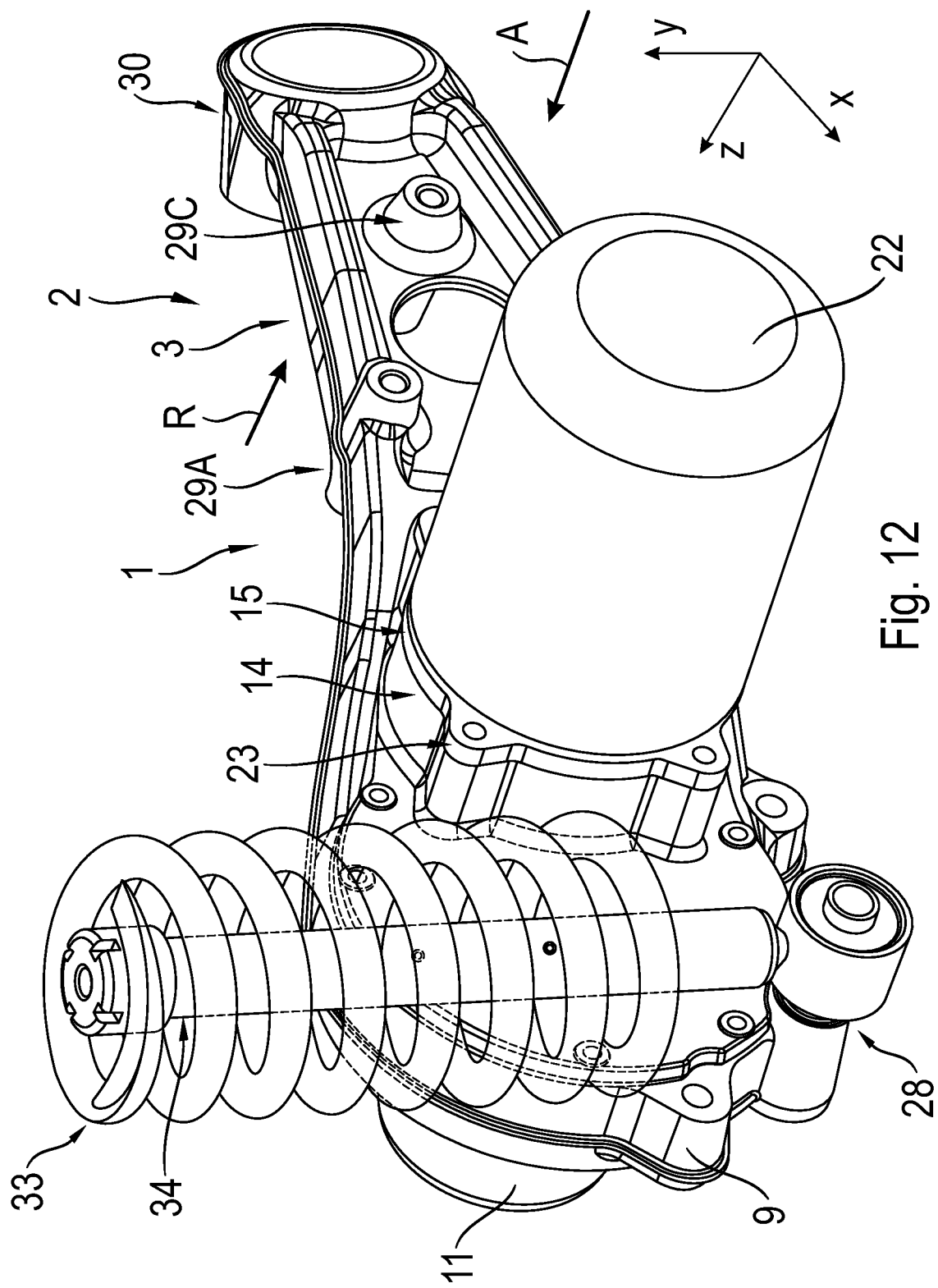
FIG. 12: A representation corresponding to FIG. 8, of a further embodiment of the trailing arm device according to the invention, in which a spring and damper device are arranged coaxially with one another.

FIG. 12 shows a representation corresponding to FIG. 8, of the trailing arm device 1 according to FIG. 1, in which the connecting device 24 is made integrally with the central housing region 9, and the spring device 33 and the damper device 34 are arranged coaxially with one another in a space-saving manner.

Depending on the application case concerned, the trailing arm device 1, or its assemblies, can be made as a cast component, a forged component, a bend-formed component, a deep-drawn component, or the like.

INDEXES

1 Trailing arm device
2 Drivable torsion beam axle
3 Seat
4 Trailing arm
Housing
6 Electric machine
7 Transmission device
8 Drive-train
9 Central housing region
10 Interior space of the housing
11 Sidewall
12 Planetary gearset
13 Spur gear stage
13A Spur gear
14 Cover element
15 Holding area
16 Shaft of the planetary gearset
17 Output shaft of the electric machine
18 Shaft of the planetary gearset
19 Bearing seat
20 Wheel shaft
21 Wheel bearing
22 Further cover element
23 Screw joint
24 Connecting device
25 Screw joint
26 Coupling area
27, 28 Connection area
29A to 29 C Threaded zone
30 Further seat
32 Bore
33 Spring device
34 Damper device
35 Circular base area
A A side of the trailing arm device facing away from the wheel side
R Wheel side of the trailing arm device
x Longitudinal direction of the vehicle
y Vertical direction of the vehicle
z Transverse direction of the vehicle

The invention claimed is:

1. A trailing arm device of a drivable torsion beam axle, the trailing arm device comprising:
   a trailing arm having a housing in which a drive-train is arranged,
   the housing comprises a central housing region and a sidewall that delimit a housing interior space, and the sidewall being arranged on a side of the housing facing toward a wheel, when the trailing arm device is installed in position on a vehicle,
   the sidewall and the central housing region being inseparably formed, and delimiting the housing interior space at least partially accommodates the drive-train, and
   the housing interior space, on a side of the housing facing away from the wheel, being delimited by at least one cover element, and the at least one cover element being detachably connectable to the central housing region.

2. The trailing arm device according to claim 1, wherein the sidewall, the central housing region and the trailing arm are inseparably formed as one piece.

3. The trailing arm device according to claim 1, wherein a further cover element is detachably connected to the cover element, on a side of the cover element facing away from the central housing region, and an electric machine is at least partially arranged in the further cover element.

4. The trailing arm device according to claim 3, wherein the further cover element is of at least approximately cup-shaped form.

5. The trailing arm device according to claim 1, wherein the trailing arm has a recess in an area of which the trailing arm is connectable to a transverse profiled element of the torsion beam axle.

6. The trailing arm device according to claim 5, wherein the trailing arm has a further recess in an area of which a main mounting is arranged.

7. The trailing arm device according to claim 1, wherein the trailing arm has first, second and third threaded zones for connecting the trailing arm to the transverse profiled element, in the installed position of the trailing arm in the vehicle, the first and the second threaded zones are spaced apart from one another in a vertical direction of the vehicle and are arranged essentially approximately one above the other, and the third threaded zone is provided on the trailing arm spaced away from the first and the second threaded zones in a longitudinal direction of the vehicle and in the vertical direction of the vehicle is arranged between the first and the second threaded zones.

8. The trailing arm device according to claim 1, wherein a connecting device is connected to at least one of the trailing arm and the central housing region, and at least one of a spring device and a damping device is connectable in an area of the connecting device.

9. The trailing arm device according to claim 8, wherein the connecting device has a coupling area that is connected to at least one of the trailing arm and the central housing region, and the connecting device has a connection area at which the at least one of the spring device and the damping device is connectable to the connecting device.

10. The trailing arm device according to claim 8, wherein the connecting device is made integrally with at least one of the trailing arm, the central housing region, the cover element and the further cover element.

11. The trailing arm device according to claim 1, wherein an output shaft of an electric machine of the drive-train is connectable, in an area of the cover element, to a shaft of a planetary gearset and a further shaft of the planetary gearset passes through an opening in the cover element and connects to a spur gear stage of the transmission device, on a side of the cover element facing away from the electric machine.

12. The trailing arm device according to claim 11, wherein at least one spur gear of the spur gear stage is mountable in a bearing seat of the sidewall.

13. The trailing arm device according to claim 1, wherein a wheel shaft can be installed to project through the sidewall into the interior space of the housing.

14. The trailing arm device according to claim 1, wherein the trailing arm device, at least in some areas, is made of at least one of a forged component and a cast component.

15. A trailing arm device of a drivable torsion beam axle that is mountable on a vehicle defining a longitudinal axis and having wheels, the trailing arm device comprising:
a trailing arm having a housing which accommodates a drive-train, the housing comprising a sidewall, a central region and a cover element, the central region having a wheel side and a laterally opposite remote side, the central region and the sidewall are formed inseparably as a single piece, the sidewall being arranged on the wheel side of the central region and the cover element is detachably connectable to the remote side of the central region, the sidewall, the central region and the cover element delimiting an interior space of the housing, and, when the trailing arm device is mounted in the vehicle, the housing is positioned such that the sidewall is on the wheel side of the central region facing one of the wheels of the vehicle, and the interior space of the housing at least partially accommodates a transmission of a drive-train.

16. The trailing arm device according to claim 15, wherein the transmission of the drive-train comprising a spur gear stage, which is accommodated within the interior space of the housing, and a planetary gear set, the cover element comprising an opening which at least partially accommodates the planetary gear set, an electric machine is mounted on a lateral side of the cover element opposite the central region such that an output shaft of the electric machine couples the planetary gear set which passes through the cover element to engage the spur gear stage, a wheel shaft of the spur gear stage extends laterally through the sidewall and is rotatably supported by a wheel bearing mounted in the sidewall such that drive laterally passes along the drive-train from the electric machine through the interior space of the housing to a side of the sidewall facing the wheel.

17. The trailing arm device according to claim 15, wherein a connecting element is connected to the central region of the housing comprises connection areas which facilitate coupling at least one of a spring device and a damping device to the trailing arm.

18. A trailing arm device of a drivable torsion beam axe, with a housing in which a drive-train is arranged and which is connected to a trailing arm,
the housing comprises a sidewall that delimits a housing interior space, on a side of the housing facing toward a wheel, when installed in position on a vehicle,
the sidewall being made integrally with a central housing region and delimiting the housing interior space that at least partially accommodates the drive-train,
the housing interior space, on a side of the housing facing away from the wheel, being delimited by at least one cover element, and the at least one cover element being detachably connectable to the central housing region, and
the cover element being in a form of an intermediate plate with a holding area, in which at least part of a transmission device of the drive-train is arranged.

* * * * *